US008510493B2

United States Patent
Gehman et al.

(10) Patent No.: US 8,510,493 B2
(45) Date of Patent: Aug. 13, 2013

(54) CIRCUIT TO EFFICIENTLY HANDLE DATA MOVEMENT WITHIN A CACHE CONTROLLER OR ON-CHIP MEMORY PERIPHERAL

(75) Inventors: Judy M Gehman, Fort Collins, CO (US); Jerome M Meyer, Chanhassen, MN (US)

(73) Assignee: LSI Corporation, Milpitas, CA (US)

( * ) Notice: Subject to any disclaimer, the term of this patent is extended or adjusted under 35 U.S.C. 154(b) by 296 days.

(21) Appl. No.: 12/978,719

(22) Filed: Dec. 27, 2010

(65) Prior Publication Data

US 2012/0166730 A1 Jun. 28, 2012

(51) Int. Cl.
*G06F 13/14* (2006.01)
*G06F 3/00* (2006.01)

(52) U.S. Cl.
USPC .................................. 710/305; 710/7; 710/21

(58) Field of Classification Search
USPC .............................................. 710/305, 7, 21
See application file for complete search history.

(56) References Cited

U.S. PATENT DOCUMENTS

| 5,307,471 | A * | 4/1994 | Ishikawa | 710/100 |
|---|---|---|---|---|
| 5,559,952 | A * | 9/1996 | Fujimoto | 345/557 |
| 6,999,088 | B1 * | 2/2006 | Van Dyke et al. | 345/544 |
| 8,035,647 | B1 * | 10/2011 | Bittel et al. | 345/531 |
| 2004/0019728 | A1 * | 1/2004 | Sharma | 710/306 |
| 2005/0063217 | A1 * | 3/2005 | Shiraishi et al. | 365/154 |
| 2012/0030532 | A1 * | 2/2012 | Jain et al. | 714/726 |

OTHER PUBLICATIONS

PowerPC(TM) Processor (476FP) Embedded Core, LSI Product Brief, Jan. 2010, pp. 1-2, LSI Corporation, Milpitas, CA.

* cited by examiner

*Primary Examiner* — Farley Abad
(74) *Attorney, Agent, or Firm* — Suiter Swantz pc llo

(57) ABSTRACT

The present invention is directed to a circuit for managing data movement between an interface supporting the PLB6 bus protocol, an interface supporting the AMBA AXI bus protocol, and internal data arrays of a cache controller and/or on-chip memory peripheral. The circuit implements register file buffers for gathering data to bridge differences between the bus protocols and bus widths in a manner which addresses latency and performance concerns of the overall system.

16 Claims, 2 Drawing Sheets

US 8,510,493 B2

CIRCUIT TO EFFICIENTLY HANDLE DATA MOVEMENT WITHIN A CACHE CONTROLLER OR ON-CHIP MEMORY PERIPHERAL

FIELD OF THE INVENTION

The present invention relates to the field of circuits and particularly to a circuit for efficiently handling data movement within a cache controller or on-chip memory peripheral.

BACKGROUND OF THE INVENTION

Currently available circuits for handling data movement within a cache controller or on-chip memory peripheral may not provide a desired level of performance. For example, said currently available circuits may have latency issues when attempting to route data into Read Data Flow (RDF) and/or Write Data Flow (WDF) register file memories.

Therefore, it may be desirable to provide a circuit for efficiently handling data movement within a cache controller or on-chip memory peripheral which addresses the above-referenced shortcomings of currently available solutions.

SUMMARY OF THE INVENTION

Accordingly, an embodiment of the present disclosure is directed to a controller (ex.—a cache controller), including: a command and control processing subsystem, the command and control processing subsystem including: a Write Address Control (WAC) partition, a Read Address Control (RAC) partition, a Write Data Flow (WDF) partition, and a Read Data Flow (RDF) partition, the WDF partition including a first register file memory and a second register file memory, the RDF partition including a first register file memory and a second register file memory; a Processor Local Bus (PLB) interface, the PLB interface configured for being communicatively coupled with the command and control processing subsystem, the PLB interface configured for providing write data to the command and control processing subsystem; an array interface, the array interface configured for being communicatively coupled with the command and control processing subsystem; and an AXI interface, the AXI interface configured for being communicatively coupled with the command and control processing subsystem, the AXI interface configured for providing read data to the command and control processing subsystem, wherein the second register file memory of the RDF partition is configured for receiving the read data provided by the AXI interface, the second register file memory of the RDF partition being further configured for transferring said received read data to at least one of: the PLB interface and the array interface, the second register file memory of the WDF partition is configured for receiving the write data provided by the PLB interface, the second register file memory of the WDF partition being further configured for transferring said received write data to at least one of: the AXI interface and the array interface, wherein the controller is configured for adjusting a read address used to read data from the AXI interface to align returned AXI data for said entry of the returned data into the RDF partition. Further, the controller of the present invention, by being configured and implemented as described herein, avoids collisions and back pressure on external buses, thereby positively affecting controller performance.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figure(s) in which.

DETAILED DESCRIPTION OF THE INVENTION

Figure 1:
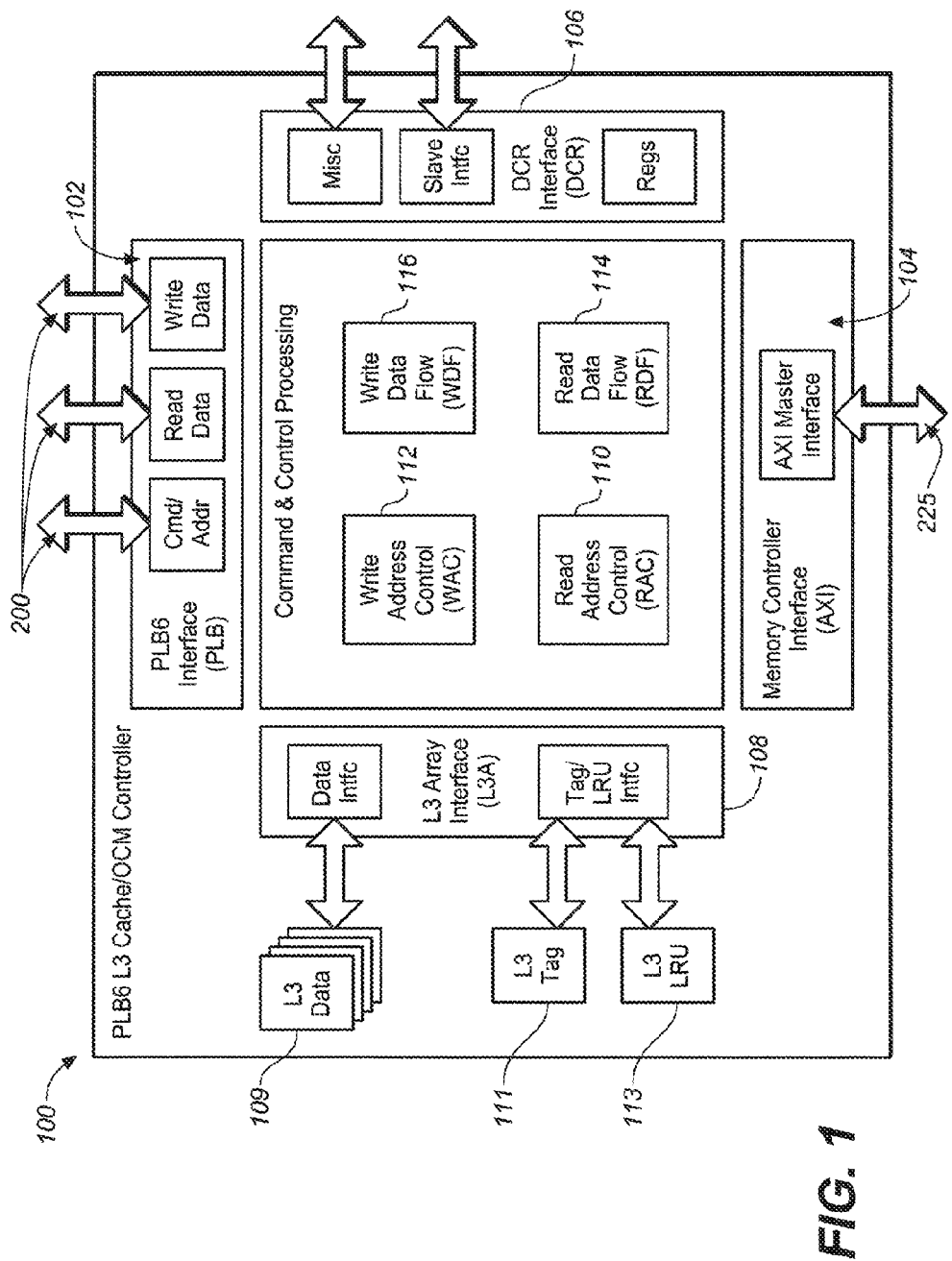
FIG. 1 is a block diagram illustration of a controller (ex.—cache controller) in accordance with an exemplary embodiment of the present disclosure.

Reference will now be made in detail to the presently preferred embodiments of the invention, examples of which are illustrated in the accompanying drawings.

The present invention addresses how issues relating to overall latency and performance of a cache controller (ex.—L3 cache controller) may be solved. A goal of the present invention is to address the following latency/performance issues (listed from highest priority to lowest priority): return read hit data (from cache) to Processor Local Bus (PLB) bus as quickly as possible; return read miss data from Advanced eXtensible Interface (AXI) port to PLB bus as quickly as possible; write data into cache (to allow future read hit to occur) as soon as possible; fill AXI read data into cache (background data for partial write, Read With No Intent to Cache (RWNITC) demand data, prefetch data (prefetch lowest priority); send AXI read request (if more than one read to be sent, send the oldest first); send AXI write request (if more than one write to be sent, send oldest first). Another goal (ex.—requirement) of the present invention is to meet PLB6 protocol of getting read data onto the PLB one to three cycles after receiving the grant. Preferably, there is no gapping of data on the PLB read data bus, but the protocol does allow the gapping. A further goal of the present invention is to improve performance of AXI writes by driving AXI write data at the same time or within a few cycles after the AXI address channel. A further goal of the present invention is to not gap data on the AXI write data bus since gapping of data could affect performance on the end slave. A further goal of the present invention is to achieve all of the above while using a minimum number of memories for area and placement concerns (ex.—congestion of wires, etc.).

A previous attempt to solve the above-referenced issues included an L2 cache controller which implemented a collision buffer. However, said previous attempt suffered from performance issues. The controller (ex.—L3 cache controller) of the present invention eliminates the collision buffer (which was implemented in the L2 cache controller), thereby eliminating the accompanying back pressure which would be present when the collision buffer filled up. Further, the controller of the present invention includes/utilizes register files (ex.—register file memories) to have in-flight data gathered close to its destination for easy access, for low latency and for meeting protocol rules. Still further, the present invention adjusts the address used to read data from an AXI port to align the data coming back so that said data goes into the Read Data Flow (RDF) more efficiently and so that the AXI bus is used more efficiently.

The present invention, as disclosed in the exemplary embodiments herein, is directed to a circuit for managing data movement between an interface supporting the Processor Local Bus 6 (PLB6) bus protocol, an interface supporting the Advance Microcontroller Bus Architecture Advanced eXtensible Interface (AMBA AXI) bus protocol and internal data arrays of a cache controller and/or on-chip memory peripheral. The PLB6 bus, AXI bus and data array bus widths may all be different from each other. Register file buffers may be implemented to provide a way to gather data to bridge the differences between the protocols and widths. In the circuit of the present invention, write data received from the PLB6 bus is gathered before being stored in the data arrays or before being transferred to the AXI bus. Further, read data received from the AXI bus is gathered before being stored in the data arrays or before being transferred to the PLB bus. The data is managed in an efficient manner that meets all bus protocols when transferring data: a.) from the data arrays to the PLB or AXI buses; b.) from the PLB bus to the AXI bus; and c.) from the AXI bus to the PLB bus. This allows the device, configured for either cache or on-chip memory, to avoid negative performance impacts to PLB or AXI buses that would affect system performance.

Referring to FIG. 1, a controller in accordance with an exemplary embodiment of the present disclosure is shown. In exemplary embodiments, the controller 100 may be a cache controller (exs.—a Processor Local Bus 6 (PLB6) L3 cache controller, L3 interface). In further embodiments, the controller 100 may be an on-chip memory peripheral.

In current exemplary embodiments, the controller 100 (ex.—the PLB6 L3 cache controller 100) may be a coherent slave on a PLB6 Symmetric Multi-Processor (SMP) coherent interconnect. The PLB6 L3 cache controller supports the presence of level 3 (L3) caches on the PLB6 bus interconnect as a low-latency caching memory target in front of a memory subsystem. The presence of any L3 caches is transparent to Central Processing Units (CPUs) and Input/Output (I/O) masters. In further embodiments, the controller 100 includes a PLB interface (ex.—PLB6 interface) 102. The PLB interface 102 may be a frontside interface configured for receiving commands from CPUs and I/O masters. The PLB interface 102 may be a partition which provides the interface for the controller 100 to a PLB bus (ex.—a PLB6 bus). The PLB interface 102 includes a slave interface with command, slave response, write data and read data buses and a snoop combined response signal.

In exemplary embodiments, the controller 100 includes a memory controller interface (ex.—an Advanced eXtensible Interface (AXI) interface) 104. The AXI interface 104 may be a backside AXI interface. Further, the AXI interface 104 may be configured for interfacing the cache controller 100 to a high-bandwidth memory controller. The AXI interface 104 may be a partition which provides the interface for the controller 100 to an AXI bus. The AXI interface 104 includes an AXI master interface with read address, write address, read data, write data and write response channels. In further embodiments, the controller 100 may include a Device Control Register (DCR) interface 106. The DCR interface 106 may be a partition which is a DCR slave interface for the controller 100 and contains registers for the controller 100.

In current exemplary embodiments of the present disclosure, the controller 100 includes an array interface (ex.—an L3 Cache Array Interface (L3A)) 108. The L3 Cache Array Interface 108 may be a partition which is configured for providing an interface to memories which make up the L3 cache data array 109, tag array 111 and Least Recently Used (LRU) array 113. In further embodiments, the controller 100 includes a Read Address Control (RAC) partition 110 and a Write Address Control (WAC) partition 112. The RAC partition 110 may be configured for accepting/receiving read requests from the PLB partition (ex.—PLB6 partition) 102 that are received from the PLB bus (ex.—PLB6 bus) and from the WAC partition 112 to read background data. The RAC partition 110 may be further configured for generating read requests for the AXI interface 104 and sending the read requests to the AXI partition 104. The RAC partition 110 may be further configured for performing all control processing of read requests. The WAC partition 112 may be configured for accepting: a.) write requests from the PLB partition 102 that are received from the PLB bus (ex.—the PLB6 bus); b.) cache maintenance operations from the DCR partition 106; and c.) cache push or eviction requests from the L3A partition 108. The WAC partition 112 is further configured for generating write requests for the AXI interface 104 and for sending said write requests to the AXI partition 104. The WAC partition 112 is further configured for performing all control processing for write requests.

In exemplary embodiments of the present disclosure, the controller 100 may include a Read Data Flow (RDF) partition 114. The RDF partition 114 may be configured for providing buffering for data received from the AXI interface 104 that is destined for the L3 cache data array and/or the PLB bus (ex.—PLB6 bus). The RDF partition 114 may be further configured for buffering data received from the L3 Cache Array Interface (L3A) 108 that is destined for the PLB bus (ex.—PLB6 bus). For example, the PLB6 bus may be 128-bits wide. In further embodiments, the controller 100 may include a Write Data Flow (WDF) partition 116. The WDF partition 116 may be configured for providing buffering for write data from the PLB partition 102 to L3 cache data arrays or the AXI interface 104. The WDF partition 116 may be further configured for providing write buffering for eviction data from the L3 cache data arrays to the AXI interface 104.

In current exemplary embodiments of the present disclosure, the PLB interface (ex.—PLB6 interface) 102 may be configured for steering requests to the RAC partition 110 and the WAC partition 112. The PLB interface 102 may be further configured for transferring read data from the RDF partition 114 to the PLB6 bus. The PLB interface 102 may be further configured for transferring write data from the PLB6 bus to the WDF partition 116. In further embodiments, the L3 cache array interface 108 may be configured for receiving requests from the RAC partition 110 and the WAC partition 112 to perform instruction processing from the PLB6 requests (exs.—reads, writes and cache operations).

In a further embodiment of the present disclosure, the controller (ex.—L3 cache controller) 100 may be configured for supporting a directly accessible random access on-chip memory (OCM) with the memory array, instead of its operation as a cache array. This enables the L3 cache controller 100 to function as a memory device in a system that may or may not have a memory controller on a backside interface of the L3 cache controller 100. In exemplary embodiments, the RAC partition 110, the WAC partition 112, the RDF partition 114 and the WDF partition 116 may collectively form and/or may be included as part of a command and control processing subsystem of the controller 100.

Figure 2:
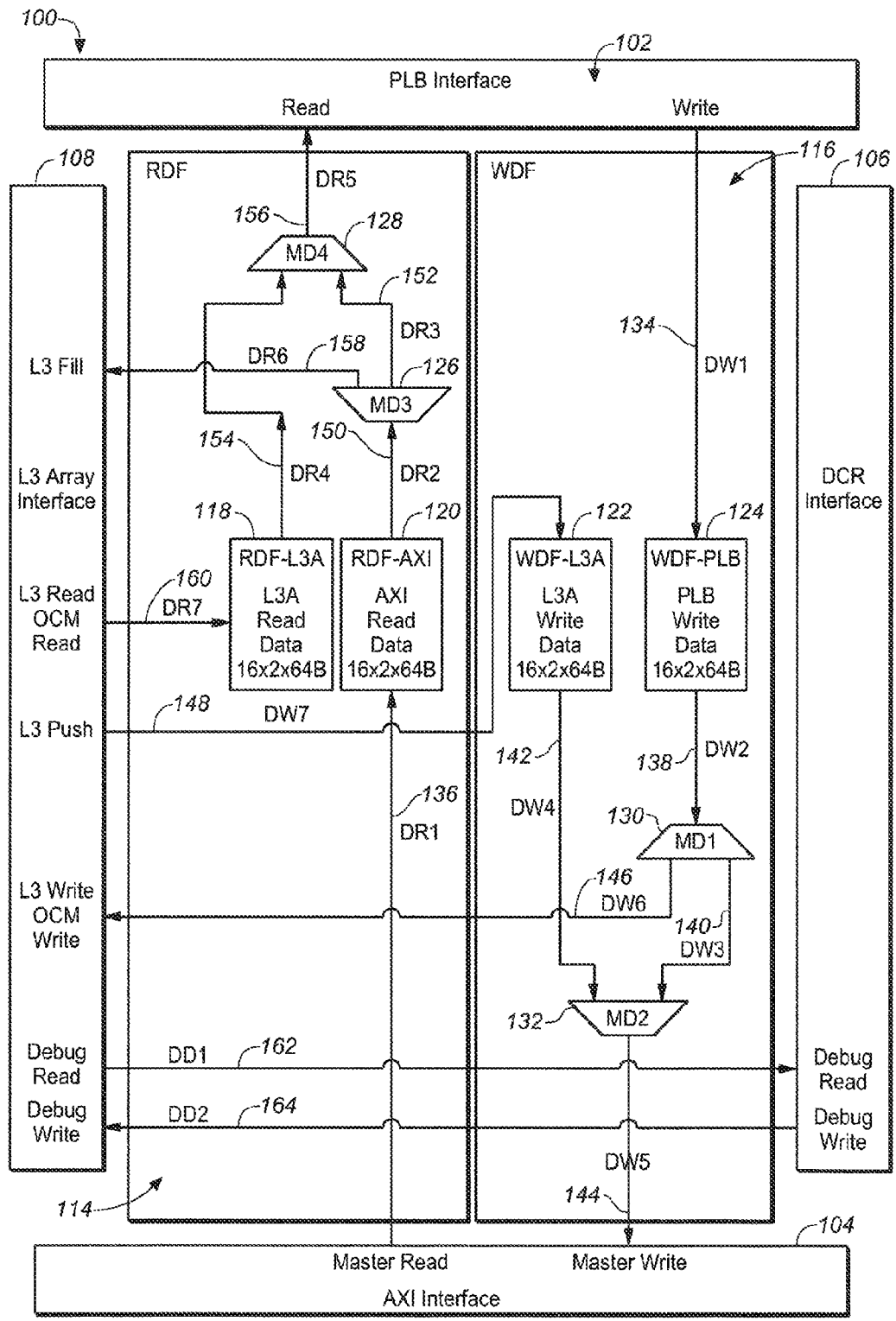
FIG. 2 is a block diagram illustration of the cache controller shown in FIG. 1, wherein the circuitry of the Read Data Flow partition and the Write Data Flow partition are shown, as well as the data flow within the cache controller, in accordance with an exemplary embodiment of the present disclosure.

Referring to FIG. 2, the data flow paths for the controller 100 (ex.—L3 Cache Controller) are shown. In exemplary embodiments, the L3 cache controller 100 may be a PLB6 slave and an Advanced eXtensible Interface (AXI) master.

Further, the L3 cache controller 100 may be configured for being a cache or an on-chip memory. When the controller 100 is in on-chip memory mode, the bridge from PLB 102 to AXI 104 may be available as well as the cache data arrays to be used as direct on-chip storage. As shown in FIG. 2, the RDF partition 114 of the controller 100 may include a first register file memory (ex.—an RDF-L3A register file memory) 118 and a second register file memory (ex.—an RDF-AXI register file memory) 120. Also shown in FIG. 2, the WDF partition 116 of the controller 100 may include a first register file memory (ex.—a WDF-L3A register file memory) 122 and a second register file memory (ex.—a WDF-PLB register file memory) 124. The register file memories (118, 120, 122, 124) may be 2l1 register file memories which each have two ports (one port for read access only and one port for write access only). In further embodiments, the register file memories (118, 120, 122, 124) may each be sized 16 (max in flight)×2 (2 beats)×64 Bytes (64B) (beat size).

In exemplary embodiments of the present disclosure, the RDF partition 114 may include a first multiplex (mux)/demultiplex (demux) structure (MD3) 126 and a second mux/demux structure (MD4) 128. Further, the WDF partition 116 may include a first mux/demux structure (MD1) 130 and a second mux/demux structure (MD2) 132. The mux/demux structures (126, 128, 130, 132) may each be configured for steering data and associated control information (ex.—valid signals, etc.) to the correct port. The second register file memory 124 of the WDF partition 116 may be connected to the first mux/demux structure 130 and the second mux/demux structure 132 of the WDF partition 116. The first register file memory 122 of the WDF partition 116 may be connected to the second mux/demux structure 132 of the WDF partition 116. The second register file memory 120 of the RDF partition 114 may be connected to the first mux/demux structure 126 and the second mux/demux structure 128 of the RDF partition 114. The first register file memory 118 of the RDF partition 114 may be connected to the second mux/demux structure 128 of the RDF partition 114.

As mentioned above, FIG. 2 illustrates the data flow paths for the cache controller 100. In exemplary embodiments, a first data path 134 (Data Write 1 (DW1)) may connect the PLB interface (ex.—PLB6 interface) 102 with second register file memory 124 (WDF-PLB) of the WDF partition 116. Write data may be routed from the PLB interface 102 to the second register file memory 124 of the WDF partition 116 via the first data path 134. For example, the write data may be received by the PLB interface 102 from the PLB data bus (ex.—via an input to the controller 100) and may send said write data to the command and control processing subsystem of the controller 100. The bus width of the PLB data bus (ex.—PLB6 data bus) may be 128-bits (16B) wide, thus the first data path 134 may be 128-bits wide. In further embodiments, a second data path 136 (Data Read 1 (DR1)) may connect the AXI interface 104 with the second register file memory 120 (RDF-AXI) of the RDF partition 114. Read data may be routed from the AXI interface 104 to the second register file memory 120 of the RDF partition 114 via the second data path 136. For example, the read data may be received by the AXI interface from the AXI data bus (ex.—via an input to the controller 100 and may send said read data to the command and control processing subsystem of the controller 100. The bus width of the AXI data bus may be 256-bits (32B) wide, thus the second data path 136 and AXI bus ports may be 256-bits wide, thus 4 data beats may make up a cache line.

In further embodiments, a third data path (Data Write 2 (DW2)) 138 may be part of the internal data array data bus and may connect the second register file memory 124 of the WDF partition 116 to the first mux/demux structure 130 of the WDF partition 116. A fourth data path (Data Write 3 (DW3)) 140 may be part of the internal data array bus and may connect the first mux/demux structure 130 of the WDF partition 116 to the second mux/demux structure 132 of the WDF partition 116. A fifth data path (Data Write 4 (DW4)) 142 may be part of the internal data array bus and may connect the first register file memory 122 of the WDF partition 116 to the second mux/demux structure 132 of the WDF partition 116. A sixth data path (Data Write 5 (DW5)) 144 may be part of the internal data array bus and may connect the second mux/demux structure 132 of the WDF partition 116 to the AXI interface 104. A seventh data path (Data Write 6 (DW6)) 146 may be part of the internal data array bus and may connect the first mux/demux structure 130 of the WDF partition 116 to the L3 Cache Array interface 108. An eighth data path (Data Write 7 (DW7)) 148 may be part of the internal data array bus and may connect the L3 Cache Array interface 108 to the first register file memory 122 of the WDF partition 116.

In exemplary embodiments, a ninth data path (Data Read 2 (DR2)) 150 may be part of the internal data array bus and may connect the second register file memory 120 of the RDF partition 114 to the first mux/demux structure 126 of the RDF partition 114. A tenth data path (Data Read 3 (DR3)) 152 may be part of the internal data array bus and may connect the first mux/demux structure 126 of the RDF partition 114 to the second mux/demux structure 128 of the RDF partition 114. An eleventh data path (Data Read 4 (DR4)) 154 may be part of the internal data array bus and may connect the first register file memory 118 of the RDF partition 114 to the second mux/demux structure 128 of the RDF partition 114. A twelfth data path (Data Read 5 (DR5)) 156 may be part of the internal data array bus and may connect the second mux/demux structure 128 of the RDF partition 114 to the PLB interface 102. A thirteenth data path (Data Read 6 (DR6)) 158 may be part of the internal data array bus and may connect the first mux/demux structure 126 of the RDF partition 114 to the L3 Cache array interface 108. A fourteenth data path (Data Read 7 (DR7)) 160 may be part of the internal data array bus and may connect the L3 Cache array interface 108 to the first register file memory 118 of the RDF partition 114. A fifteenth data path (Data Debug 1 (DD1)) 162 and a sixteenth data path (Data Debug 2 (DD2)) 164 may be connect the array interface 108 and the DCR interface 106 and may be utilized for allowing debug requests to access the L3 Cache Array interface 108 (and the L3 cache data array 109) from the DCR interface 106.

In current exemplary embodiments of the present disclosure, read data may be routed from the AXI interface 104 to the PLB interface 102 via data paths 136, 150, 152 and 156. Write data may be routed from the PLB interface 102 to the AXI interface 104 via data paths 134, 138, 140 and 144. Read data may be routed from the first mux/demux structure 126 of the RDF partition 114 to the L3 Cache Array interface 108 via data path 158. Write data may be routed from the first mux/demux structure 130 of the WDF partition 116 to the L3 Cache Array interface 108 via data path 146. L3 cache (ex.—L3 cache data array 109) pushes due to castouts may follow the write data and may be routed from the L3 Cache Array interface 108 to the first register file memory 122 of the WDF partition 116 via data path 148. L3 cache (ex.—L3 cache data array 109) pushes due to read hits may follow the read data and may be routed from the L3 Cache Array interface 108 to the first register file memory 118 of the RDF partition 114 via data path 160.

In exemplary embodiments, when the controller 100 is operating in cache mode, the data flow for a PLB non-cacheable write may be as follows: write data flows from the PLB interface 102 to data path (DW1) 134, to register file memory (WDF-PLB) 124, to data path (DW2) 138, to data path (DW3) 140 via mux/demux structure (MD1) 130, to data path (DW5) 144 via mux/demux structure (MD2) 132, to the AXI interface 104. In further embodiments, when the controller is operating in cache mode, the data flow for a PLB non-cacheable read may be as follows: read data flows from the AXI interface 104 to data path (DR1) 136, to register file memory (RDF-AXI) 120, to data path (DR2) 150, to data path (DR3) 152 via mux/demux structure (MD3) 126, to data path (DR5) 156 via mux/demux structure (MD4) 128, to the PLB interface 102.

In further embodiments, when the controller 100 is operating in cache mode, the data flow for a PLB cacheable full 128B write (hit and miss) may be as follows: write data flows from the PLB interface 102 to data path (DW1) 134, to register file memory (WDF-PLB) 124, to data path (DW2) 138, to data path (DW6) 146 via mux/demux structure (MD1) 130, to L3 Array interface 108, to data array 109. In still further embodiments, when the controller 100 is operating in cache mode, the data flow for a PLB cacheable partial (non-128B) write (hit) may be as follows: write data flows from the PLB interface 102 to data path (DW1) 134, to register file memory (WDF-PLB) 124, to data path (DW2) 138, to data path (DW6) 146 via mux/demux structure (MD1) 130, to L3 Array interface 108, to data array 109. In further embodiments, when the controller 100 is operating in cache mode, the data flow for a PLB cacheable partial (non-128B) write (miss) may be as follows: write data flows from the PLB interface 102 to data path (DW1) 134, to register file memory (WDF-PLB) 124, to data path (DW2) 138, to data path (DW6) 146 via mux/demux structure (MD1) 130, to L3 Array interface 108, to data array 109. During said PLB cacheable partial (non-128B) write (miss), line data (ex.—background data) is first obtained from the AXI interface 104, said line data flowing from the AXI interface 104 to data path (DR1) 136, to register file memory (RDF-AXI) 120, to data path (DR6) 158 (via data path (DR2) 150 and mux/demux structure (MD3) 126), to the data array 109 via L3 Cache array interface 108. Once the background data is put into the data array 109, then the write data moves from register file memory (WDF-PLB) 124 to data array 109.

In exemplary embodiments, when the controller 100 is operating in cache mode, the data flow for a PLB cacheable read (hit) may be as follows: read data may flow from the data array 109 to the L3 Cache array interface 108, to data path (DR7) 160, to register file memory (RDF-L3A) 118, to data path (DR4) 154, to data path (DR5) 156 via mux/demux structure (MD4) 128, to the PLB interface 102. In further embodiments, when the controller 100 is operating in cache mode, the data flow for a PLB cacheable read (miss) may be as follows: read data flows from the AXI interface 104 to data path (DR1) 136, to register file memory (RDF-AXI) 120. In one embodiment, the data may then go from register file memory (RDF-AXI) 120 to data path (DR2) 150, to data path (DR3) 152 via mux/demux structure (MD3) 126, to data path (DR5) 156 via mux/demux structure (MD4) 128, to the PLB interface 102. Further, if the data is allocated into cache, the data may go from register file memory (RDF-AXI) 120 to data path (DR6) 158 via mux/demux structure (MD3) 126, to the data array 109 via the L3 cache array interface 108.

In current exemplary embodiments of the present disclosure, when the controller 100 is operating in OCM mode, the data flow for a PLB non-OCM write may be as follows: write data may flow from the PLB interface 102 to data path (DW1) 134, to register file memory (WDF-PLB) 124, to data path (DW2) 138, to data path (DW3) 140 via mux/demux structure (MD1) 130, to data path (DW5) 144 via mux/demux structure (MD2) 132, to the AXI interface 104. In further embodiments, when the controller 100 is operating in OCM mode, the data flow for a PLB non-OCM read may be as follows: read data may flow from the AXI interface 104 to data path (DR1) 136, to register file memory (RDF-AXI) 120, to data path (DR2) 150, to data path (DR3) 152 via mux/demux structure (MD3) 126, to data path (DR5) 156 via mux/demux structure (MD4) 128, to the PLB interface 102.

In exemplary embodiments, when the controller 100 is operating in OCM mode, the data flow for a PLB OCM write may be as follows: write data may flow from the PLB interface 102 to data path (DW1) 134, to register file memory (WDF-PLB) 124, to data path (DW2) 138, to data path (DW6) 146 via mux/demux structure (MD1) 130, to the L3 Cache array interface 108, to the data array 109. In further embodiments, when the controller 100 is operating in OCM mode, the data flow for a PLB OCM read may be as follows: read data flows from the data array 109 to data path (DR7) 160 via L3 Cache array interface 108, to register file memory (RDF-L3A) 118, to data path (DR4) 154, to data path (DR5) 156 via mux/demux structure (MD4) 128, to the PLB interface 102.

As mentioned above, the controller 100 is configured for placing data into register file memories (118, 120, 122, 124) (ex.—register files) for allowing the data to be closer to the bus when the data is in-flight, thereby allowing certain goals and protocols to be met. Pulling data from Static Random Access Memories (SRAMs) data arrays is slow to be able to meet the PLB protocol and AXI goals. The register files (118, 120, 122, 124) also provide a way to gather data from the AXI and PLB buses since they come to us in multiple beats (ex.—beat is <128B cache line). The controller 100 of the present invention is configured for placing write data on an AXI bus at the same time or only a few cycles after an address/control, thereby allowing the controller to meet an AXI goal. Further, the controller 100 of the present invention is configured for read data on a PLB bus 1-3 cycles after receiving grant.

In further embodiments, the register files (118, 120, 122, 124) are organized to allow the L3 Array (L3A) (ex.—L3 cache data array 109) to push/pull one beat (64B) at a time which is two push/pull per L3 line. The organization of the L3 data array 109 to do two, 64B accesses per cache line places an input constraint on the design of the controller 100 to allow efficient in/out of the L3 data array 109. In exemplary embodiments, a cache line (ex.—a cache controller line) may be 128B, meaning that 8 PLB data beats may make up a cache line. There are 16 possible outstanding read and write transactions at one time. To allow 1:1 mapping of the control information of these reads/writes to the in flight data storage, each register file (118, 120, 122, 124) is sized as 16 (max in flight)×2 (2 beats)×64B (beat size). The 1:1 mapping of the control information to data storage allows for easy mapping of control information to data location instead of using a look-up table mapping methodology. The present implementation may break this down further to tile smaller memories up to this size, with Memory 0 holding Quad Word 0 (QW0) and QW4 for buffers 1-16 (organized as 32×128-bits), Memory 1 holding QW1 and QW5 for buffers 1-16 (organized as 32×128-bits), Memory 2 holding QW2 and QW6 for buffers 1-16 (organized as 32×128-bits), and Memory 3 holding QW3 and QW7 for buffers 1-16 (organized as 32×128-bits). In an alternative embodiment of the present implementation, the memories may be bigger (ex.—32×144 bits) because the data may be protected using byte parity. In further embodiments, other protection schemes such as word parity, Error Correcting Code (ECC), and/or the like may be used.

The organization of the cache data array 109 dictates the best register file organization for making push/pull efficient as possible. L3A (108) does line accesses as two, 64B beats which is why most of the data paths are 512-bits (64B) wide. For instance, data path (DW1) 134 may be 128-bits, data path (DR1) 136 may be 256-bits, while other data paths mentioned herein may be 512-bits. In exemplary embodiments, the controller 100 may be configured so that, in the WDF partition 116, PLB data (via data path (DW1) 134) is allowed to write into a first in-flight memory location or register file (ex.—register file memory (WDF-PLB) 124), while L3A eviction data (via data path (DW7) 148) is allowed to concurrently (ex.—simultaneously) write into a second in-flight memory location or register file (ex.—register file memory (WDF-L3A) 122) without collisions. In this manner, the controller 100 of the present invention avoids having to use collision buffers and avoids having to deal with overflow problems associated with implementing collision buffers. Further, by utilizing the register file memories (122, 124) in the manner described above, the controller 100 avoids the stalling of the L3A (108) associated with currently available controllers, since said currently available controllers may implement a collision buffer and may not be able to take eviction data when the collision buffer is full. Thus, the controller 100 of the present invention may be able to handle any amount of PLB write data from different write requests to be combined.

In exemplary embodiments, the controller 100 may be configured so that, in the RDF partition 114, AXI data (via data path (DR1) 136 is allowed to write into a first in-flight memory location or register file (ex.—register file memory (RDF-AXI) 120), while L3A hit data (via data path (DR7) 160 is allowed to concurrently (ex.—simultaneously) write into a second in-flight memory location or register file (ex.—register file memory (RDF-L3A) 118) without collisions. In this manner, the controller 100 of the present invention avoids having to use collision buffers and avoids having to deal with overflow problems associated with implementing collision buffers. Further, by utilizing the register file memories (118, 120) in the manner described above, the controller 100 avoids stalling the AXI data bus, allows for any amount of AXI read data to be interleaved, and allows for handling of any gapping of data.

In further embodiments, the AXI interface 104 and the L3A interface 108 may share reading of WDF-PLB data. In some instances, PLB bus data stored in the WDF-PLB 124 may be non-cacheable and therefore, must go to the AXI interface 104 (ex.—AXI port). In other instances, PLB bus data stored in the WDF-PLB 124 may be cacheable (or is to be stored in the cache data array 109 in the OCM mode) and therefore, must go to the L3A Cache array interface 108 (and then to the L3A array 109). In instances where the AXI interface 104 and the L3A Cache array interface 108 attempt to concurrently (ex.—simultaneously) read the WDF-PLB 124, the L3A interface 108 is designed to have priority and the AXI interface 104 must wait, thereby allowing the controller 100 to meet latency/performance goals by making the task of getting data into the data array 109 a higher priority than getting data out of the AXI to a backing slave (ex.—typically a DDR memory controller).

In exemplary embodiments, the controller 100 is configured such that the PLB interface 102 and the L3A interface 108 share reading of RDF-AXI data. In some instances, AXI bus data stored in the RDF-AXI 120 is non-cacheable or not allocated to the cache data array 109 and must be sent directly on the PLB bus. In other instances, AXI bus data may be obtained due to a partial write miss or may be prefetch (hint) data that should not be returned on the PLB bus. In still further instances, there may be occasions when the data must be returned to the PLB bus and allocated to the cache data array 109. In instances where the PLB interface 102 and the L3A interface 108 attempt to concurrently (ex.—simultaneously) read the RDF-AXI, the PLB interface 102 is designed to have priority and the L3A (108) must wait, thereby allowing the controller 100 to meet the latency/performance goals of making returning read data on the PLB bus a higher priority than putting data into the cache data array 109. For example, it may take eight writes to load up a PLB line into WDF, two writes to load up a L3A eviction/castout into WDF, two reads to unload L3A data from WDF, two reads to unload AXI data from WDF, two writes to load up L3A hit data into RDF, four writes to load up a line into RDF, 2 reads to unload L3A data from RDF, 2-X reads to unload PLB data from RDF.

Some tradeoffs are required in the design of the controller 100 to balance latency/performance priorities when returning AXI read data and steering it to the PLB interface 102 and/or the L3 data array 109. In exemplary embodiments, the AXI interface 104 may deliver 2 QWs per access. Therefore, four or five AXI data beats deliver the data of 8 QW databeats for the PLB bus. One goal is to return read data to the PLB requester as quickly as possible. On some occasions, one or two QWs may be received at a time from the AXI interface 104 which need to be steered to the PLB bus. Data from the AXI interface 104 may be interleaved with data from another request and the data may be gapped/paced by an AXI slave. The L3 interface 100 may be configured for controlling the order in which it gets data by using address bits for a request to request a critical QW or something else of an L3 line. The AXI interface 104 cannot re-order data beats within a burst.

Data from the AXI interface 104 may go entirely to the PLB bus (full read miss, non-cacheable), all to the L3A (108) (prefetch, background write data for partial write misses), or to both the PLB interface 102 and the L3A interface 108 (partial reads—Read With No Intent To Cache (RWNITC)) or when full reads are configured to be allocated). The architecture of the controller 100 of the present invention has this data sharing one register file (RDF-AXI) 120.

In exemplary embodiments, the PLB read data bus must be requested to return data. The L3 interface 100 asserts a request and waits for a grant. After receiving a grant, the L3 interface 100 must drive the first data beat within 1-3 cycles. The data may be gapped/paced after that, but it is not desirable since this may affect the overall system bandwidth on the read PLB bus. The PLB address is:

I_s_addr[60:63]→specifies the byte addresses
I_s_addr[57:59]→specifies the critical quad word (QW) of the 128B (8QW) line
I_s_addr[0:56]→specifies the rest of the address The amount of data beats it takes for the AXI interface 104 to return 8 QWs of data depends if an aligned or non-aligned transfer is requested on the bus. If an aligned transfer is requested (address specifies QW0, QW2, QW4, QW6 as critical QW), the AXI data may be returned in 4 data beats. If an unaligned transfer for 8 QWs is requested (address specifies QW1, QW3, QW5 or QW7 as the critical QW), the AXI data is returned in 5 AXI data beats. For instance:

I_s_addr[57:59]=000 (critical QW is 0-even), I_s_size=111:
Data is returned as:
Beat 1: {QW0, QW1}
Beat 2: {QW2, QW3}
Beat 3: {QW4, QW5}
Beat 4: {QW6, QW7}

I_s_addr[57:59]=001 (critical QW is 1-odd), I_s_size=111:
Data is returned as:
Beat 1: {—, QW1}
Beat 2: {QW2, QW3}
Beat 3: {QW4, QW5}
Beat 4: {QW6, QW7}
Beat 5: {QW0, —}

For the solution, in the controller 100 of the present invention, the critical word address driven onto the AXI bus is adjusted, which provides the advantage of: minimizing beats on the AXI bus (ex.—four beats may be done instead of five to save a cycle when critical QW is odd); filling up the 64B of the RDF-AXI 120 which contains the critical word, since only four transfers are done (instead of five transfers) on data path (DR1) 136 into the RDF-AXI 120. Details of address modifications are as follows:

ARADDR modification compared to PLB address I_s_addr
  Size=111 (getting 8 QWs for PLB), line=n/a
    Get QW0 or QW4 first based on PLB addr[57] and do a AXI wrap access to get the full line
  Size=011 (getting 4 QWs for PLB) and Line=1
    Meaning PLB wants QW0-3 or QW4-7
    Get QW0 or QW4 first based on PLB Addr[57]
  Size=001 (getting 2 QWs for PLB) and Line=1
    Meaning PLB wants QW0&1 or QW2&3 or QW4&5 or QW6&7
      Make odd QW addresses even (so ask for QW0, then QW1 even if QW1 is the critical word
      CmdAddrQW→{Address[*] [57:58], 1'b0}
  Else (line=0) & not doing an allocation
    Don't modify address (its Line=0 access)

The above discussion applies well when 8 QWs are requested. A PLB master can request reads that range from 1B to 128B (8 QWs). In instances where such requests are non-cacheable or not allocated to the cache data array 109, only a same number of bytes may be requested on the AXI interface 104. The returning data may be treated as quadwords that have don't care information on byte lanes that are not of interest. In cases where PLB request line is 0 (no wrap) and size is less than 8 QWs, the critical word of the address driven onto the AXI bus is not adjusted because data will not be wrapping within the 128B line. For example, if critical QW is 1 and PLB request size=110 (7QWs), QW0 is not desired. QW1, QW2, QW3 may be obtained from the AXI bus and then a PLB6 request operation may be started. The AXI interface 104 may work on getting QW4-7. AXI traffic will still be 4 databeats. Since it isn't needed, the QW address QW0 is not aligned, and if the AXI request address was aligned up to QW2, QW1 would not be obtained (or we wrap to get QW0 and QW1 last and therefore get the critical word last, which doesn't make sense to do, since the goal is to return the critical word first on the PLB bus. For example:
I_s_addr[57:59]=001 (critical QW is 1-odd), I_s_size=110: Data is returned as:
  Beat 1: {—, QW1},
  Beat 2: {QW2, QW3},
  Beat 3: {QW4, QW5},
  Beat 4: {QW6, QW7}

The L3 cache controller 100 is configured for modifying the address before requesting the AXI read data to control the order in which the read data is returned.

The last part of the solution after data is coming back from the AXI bus and getting put into the RDF-AXI block 120 is when the PLB interface 102 and L3A interface 108 should retrieve data from the RDF-AXI 120. The L3A interface 108 cannot tolerate gaps in the data, said data must all be available. Thus, since the AXI bus can gap data to the L3 design, the L3A interface block is not notified to retrieve the data until all the data has arrived. The PLB interface needs to request the PLB read data bus. Three options may be considered in returning the data to the PLB 102, these are: 1) wait until all the data arrives, then start the PLB bus request process; 2) wait for 4 QWs to be ready (ex.—wait for half of the RDF-AXI 120 to be ready) before starting the request; 3) start the PLB request when the first AXI beat (ex.—2 QWs) arrives. The second option may be preferable in that it adds less latency than the first option. Further, the third option may require more PLB interface accesses to the RDF-AXI block than the second option, which may result in the L3A interface being blocked out from accessing the RDF-AXI 120. For example, when transferring 8QW back to the PLB, the first option may require two PLB interface accesses of RDF-AXI 120, the second option may require 2-3 PLB interface accesses of RDF-AXI 120, and the third option may require 4 PLB interface accesses of RDF-AXI 120. The second option may allow more opportunity for L3A interface accesses compared to the third option, but may also speed up the PLB request compared to the first option.

In exemplary embodiments, when the second option is implemented, in order to speed up the flow, the PLB interface 102 may start the PLB bus request when one 64B portion (ex.—half) of the RDF-AXI 120 is ready. A half may be defined as QW0-3 or QW4-7. The PLB interface 102 may retrieve said half from the RDF-AXI 120 at that time. The PLB interface 102 may contain a 128B buffer so that it can hold all the data while it is waiting for the PLB grant. The PLB interface 102 may start driving PLB data immediately, at the time the PLB grant is received. This allows the controller (ex.—L3 controller) 100 to drive data immediately after a grant is received, so it does not have to wait the three cycles that the protocol allows. The PLB interface block 102 may snoop on the data write from the AXI interface 104 to the RDF-AXI 120 to know when the other data arrives. The PLB interface block 102 may do 1 or 2 reads to this other RDF-AXI half to retrieve the missing data as needed.

In further embodiments, communications may be made to the PLB interface block 102 indicating which halves of the line are valid and ready to go. If only one half is valid, the PLB interface 102 may monitor the writes on data path (DR1) 136 to determine when the rest of the data is ready. If there is a delay in getting the rest of the AXI data, the PLB interface 102 may need to gap the read data returned. The advantage to the system (ex.—controller 100) of the present invention is that critical QW is returned first, which may allow the PLB master to end any stalls/waiting which may have occurred.

The controller 100 may be configured for delivering the first 1-4 QW without a gap on the PLB bus, but may gap the data of up to as many as the last 4 QWs only if they are gapped on the AXI bus from the returning AXI slave. This provides tradeoff of streaming the data as quickly to the PLB master as possible versus dealing with gap issues and meeting PLB protocol of not requesting the PLB bus too soon. In the controller 100 of the present invention, said gapping may be rare and thus, the tradeoff would be worth the speeding up of PLB data return for most cases. In exemplary embodiments, the L3 interface 100 may deliver the first critical QW one cycle earlier (ex.—when 32B is in the RDF-AXI 120 instead of waiting for 64B), at the expense of requiring the PLB interface 102 to access the RDF-AXI 120 more often to stream the data in 32B chunks instead of the initial 64B chunk, which would block the L3A interface 108 from the accessing the RDF-AXI 120. In further embodiments, delay may be made up when the critical QW is odd by adjusting the critical word of the address presented on the AXI bus to receive four data beat transfers instead of five data beat transfers.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A controller, comprising:
    a command and control processing subsystem;
    a bus interface, the bus interface configured for being communicatively coupled with the command and control processing subsystem;
    an array interface, the array interface configured for being communicatively coupled with the command and control processing subsystem; and
    a memory controller interface, the memory controller interface configured for being communicatively coupled with the command and control processing subsystem, wherein the command and control processing subsystem includes: a Write Address Control (WAC) partition, a Read Address Control (RAC) partition, a Write Data Flow (WDF) partition, and a Read Data Flow (RDF) partition, the RAC partition is configured for generating read requests for the memory controller interface and for providing said generated read requests to the memory controller interface, the WAC partition is configured for generating write requests for the memory controller interface and for providing said generated write requests to the memory controller interface, the WAC partition is configured for receiving: write requests from the bus interface, cache maintenance operations from a Device Control Register (DCR) partition, and cache push requests from the array interface.

2. A controller as claimed in claim 1, wherein the RDF partition includes a first register file memory and a second register file memory.

3. A controller as claimed in claim 2, wherein the WDF partition includes a first register file memory and a second register file memory.

4. A controller as claimed in claim 3, wherein the RDF partition includes a first mux/demux structure and a second mux/demux structure, the first mux/demux structure being connected to the second register file memory and the bus interface, the second mux/demux structure being connected to the first register file memory, the second register file memory and the bus interface.

5. A controller as claimed in claim 1, wherein the RAC partition is configured for receiving read requests from a bus partition.

6. A controller as claimed in claim 1, wherein the RDF partition is configured for providing buffering for data received from the memory controller interface, said data received from said memory controller interface having as its destination one of: a cache data array of the controller; and a bus.

7. A controller as claimed in claim 6, wherein the RDF partition is configured for providing buffering for data received from the array interface, said data received from the array interface having as its destination the bus.

8. A controller as claimed in claim 1, wherein the WDF partition is configured for providing buffering for write data received from the bus interface, said write data received from the bus interface having as its destination one of: the cache data array of the controller; and the memory controller interface of the controller.

9. A controller as claimed in claim 8, wherein the WDF partition is configured for providing write buffering for eviction data received from the cache data array, said eviction data having as its destination the memory controller interface.

10. A controller as claimed in claim 1, wherein the controller is one of: a cache controller and an on-chip memory peripheral.

11. A controller, comprising:
    a command and control processing subsystem, the command and control processing subsystem including: a Write Address Control (WAC) partition, a Read Address Control (RAC) partition, a Write Data Flow (WDF) partition, and a Read Data Flow (RDF) partition, the WDF partition including a first register file memory and a second register file memory, the RDF partition including a first register file memory and a second register file memory;
    a Processor Local Bus (PLB) interface, the PLB interface configured for being communicatively coupled with the command and control processing subsystem;
    an array interface, the array interface configured for being communicatively coupled with the command and control processing subsystem; and
    an Advanced eXtensible Interface (AXI) interface, the AXI interface configured for being communicatively coupled with the command and control processing subsystem, wherein eviction data from the array interface writes into the first register file memory of the WDF partition via a first data path, while write data received via the PLB interface is written into the second register file memory of the WDF partition via a second data path, said second data path being separate from said first data path, said writing of the eviction data into first register file memory and said writing of the write data received via the PLB interface into the second register file memory occurring concurrently.

12. A controller as claimed in claim 11, wherein read data received via the AXI interface writes into the first register file memory of the RDF partition via a third data path, while hit data from the array interface is written into the second register file memory of the RDF partition via a fourth data path, said fourth data path being separate from said third data path, said writing of the read data into the first register file memory of the RDF partition and said writing of the hit data into the second register file memory of the RDF partition occurring concurrently.

13. A controller as claimed in claim 12, wherein when the array interface and the AXI interface attempt to concurrently read data from the second register file memory of the WDF partition, the array interface reads data from the second register file memory of the WDF partition before the AXI interface reads data from the second register file memory of the WDF partition.

14. A controller as claimed in claim 13, wherein when the PLB interface and the array interface attempt to concurrently read data from the first register file memory of the RDF partition, the PLB interface reads data from the first register file memory of the RDF partition before the array interface reads data from the first register file memory of the RDF partition.

15. A controller, comprising:
- a command and control processing subsystem, the command and control processing subsystem including: a Write Address Control (WAC) partition, a Read Address Control (RAC) partition, a Write Data Flow (WDF) partition, and a Read Data Flow (RDF) partition, the WDF partition including a first register file memory and a second register file memory, the RDF partition including a first register file memory and a second register file memory;
- a Processor Local Bus (PLB) interface, the PLB interface configured for being communicatively coupled with the command and control processing subsystem, the PLB interface configured for receiving write data from a PLB bus and providing the write data to the command and control processing subsystem;
- an array interface, the array interface configured for being communicatively coupled with the command and control processing subsystem; and
- an Advanced eXtensible Interface (AXI) interface, the AXI interface configured for being communicatively coupled with the command and control processing subsystem, the AXI interface configured for receiving read data from an AXI bus and providing the read data to the command and control processing subsystem,
- wherein the second register file memory of the RDF partition is configured for receiving the read data provided by the AXI interface, the second register file memory of the RDF partition being further configured for transferring said received read data to at least one of: the PLB interface and the array interface, the second register file memory of the WDF partition is configured for receiving the write data provided by the PLB interface, the second register file memory of the WDF partition being further configured for transferring said received write data to at least one of: the AXI interface and the array interface.

16. A controller as claimed in claim 15, wherein the controller is configured for adjusting a read address used to read data from the AXI interface to align returned AXI data for said entry of the returned data into the RDF partition for promoting efficient use of AXI and PLB bandwidth.

* * * * *